(12) United States Patent
Shore et al.

(10) Patent No.: US 7,752,756 B2
(45) Date of Patent: Jul. 13, 2010

(54) BUSH AND METHOD OF MANUFACTURING A BUSH

(75) Inventors: David Shore, Lincoln (GB); Chris Bennett, Notts (GB)

(73) Assignee: Minebea Co., Ltd., Nagano (JP)

( * ) Notice: Subject to any disclaimer, the term of this patent is extended or adjusted under 35 U.S.C. 154(b) by 1306 days.

(21) Appl. No.: 10/551,255

(22) PCT Filed: Feb. 3, 2004

(86) PCT No.: PCT/GB2004/000408

§ 371 (c)(1),
(2), (4) Date: Sep. 26, 2005

(87) PCT Pub. No.: WO2004/085090

PCT Pub. Date: Oct. 7, 2004

(65) Prior Publication Data

US 2006/0174485 A1    Aug. 10, 2006

(30) Foreign Application Priority Data

Mar. 27, 2003    (GB) .................................. 0307120.6

(51) Int. Cl.
*B21D 39/03*    (2006.01)
(52) U.S. Cl. .................... 29/898.059; 29/412; 29/469.5; 29/898.054; 29/898.056
(58) Field of Classification Search .................. 29/428, 29/888.3, 898, 898.054, 898.056, 898.059, 29/898.1, 412, 469.5; 16/2.1; 156/216, 221, 156/250

See application file for complete search history.

(56) References Cited

U.S. PATENT DOCUMENTS

| | | | | |
|---|---|---|---|---|
| 2,255,964 A | * | 9/1941 | Blaho | 220/601 |
| 3,873,168 A | * | 3/1975 | Viola et al. | 384/298 |
| 5,499,440 A | * | 3/1996 | Satoh et al. | 29/512 |
| 6,474,941 B2 | * | 11/2002 | Dingwell et al. | 415/162 |

FOREIGN PATENT DOCUMENTS

| | | |
|---|---|---|
| EP | 1213446 | 6/2002 |
| GB | 2095170 | 9/1982 |
| GB | 2 399 867 | 9/2004 |
| GB | 2 399 868 | 9/2004 |
| JP | 61115625 | 6/1986 |
| WO | WO 02/070908 | 9/2002 |

OTHER PUBLICATIONS

Combined Search and Examination Report for corresponding UK Patent Application No. GB 0307120.6, Sep. 19, 2003.
Search Report for United Kingdom Patent Application No. GB 0402248.9, Mar. 30, 2004.

* cited by examiner

*Primary Examiner*—David P Bryant
*Assistant Examiner*—Bayan Salone
(74) *Attorney, Agent, or Firm*—Klarquist Sparkman, LLP

(57) ABSTRACT

A lined and flanged bush and method of manufacturing the same comprising: providing a liner having an aperture; locating the aperture in the liner around the spigot such that the liner lies on the surface; and stamping out the blank around the spigot to provide a lined and flanged bush.

16 Claims, 3 Drawing Sheets

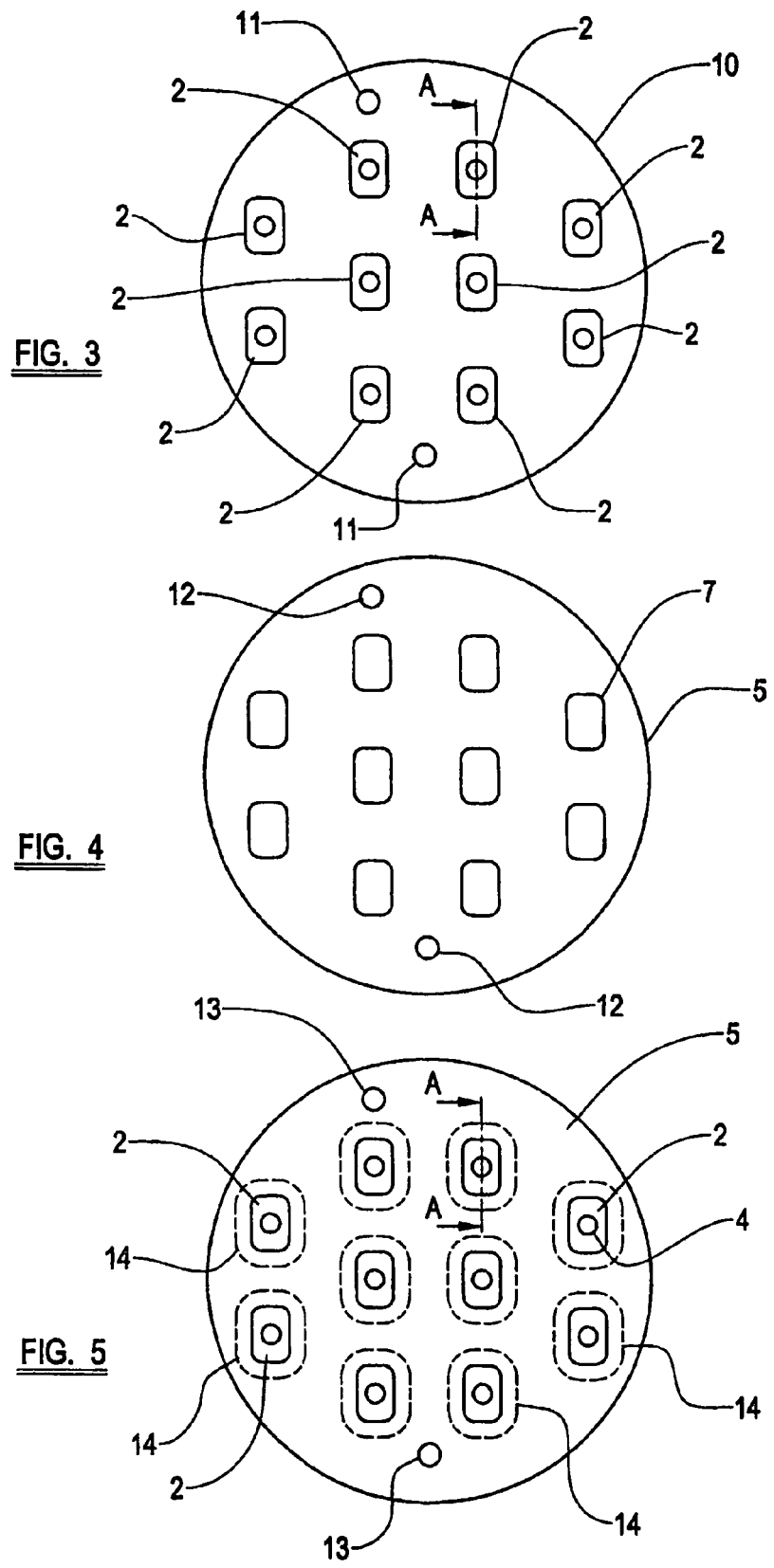

BUSH AND METHOD OF MANUFACTURING A BUSH

This is the U.S. National Stage of International Application No. PCT/GB2004/000408, filed Feb. 3, 2004, which in turn claims the benefit of Great Britain Patent Application No. GB 0307120.6 filed, Mar. 27, 2003.

This invention relates to a bush and a method of manufacturing a bush, and more particularly to a method of manufacturing a lined and flanged bush.

Blow-down panel bushes are used in aerospace applications and comprise a flanged bush to which a ring of self-lubricating liner is bonded. The component is manufactured and machined on a piece-by-piece basis and is small, standing approximately 4 mm high with a rounded rectangular base being approximately 20 mm long and 16 mm wide.

Once the flanged bush has been machined to provide a spigot with a central bore upstanding from the surrounding flange surface, the ring of self-lubricating liner is cut to size and bonded to the flange surface. Great care must be taken to ensure that a constant and consistent pressure is applied to the liner to effect a good adhesive bond between the liner and the flange surface. After bonding is complete, the outer edge of the ring of self-lubricating liner must be trimmed to ensure that no part of the liner protrudes beyond the edge of the flange surface and to ensure that there is no fretting of the liner edge. It is imperative that the liner edge is fully bonded right up to the edge of the flange surface.

With such small pieces of manufacture, it is difficult to maintain a good quality finished product. The manufacturing process is labour-intensive, involves many steps and is also expensive.

It is an object of the present invention to ameliorate the above-mentioned disadvantages.

Accordingly, one aspect of the present invention provides a method of manufacturing a method of manufacturing a bush from a blank comprising the steps of: providing a blank having a surface to be lined and at least one spigot upstanding from the surface; providing a liner having an aperture; locating the aperture in the liner around the spigot such that the liner lies on the surface; and stamping out the blank around the spigot to provide a lined and flanged bush.

In order that the present invention may be more readily understood, embodiments thereof will now be described, by way of example, with reference to the accompanying drawings, in which:

FIG. 3 is a plan view of a billet of material machined to provide an array of upstanding spigots;

FIG. 4 is a plan view of a self-lubricating liner for use with the billet of FIG. 3;

FIG. 5 is a plan view of the liner of FIG. 4 registered with the billet of FIG. 3 and showing the intended punch lines for individual bushes.

Figure 2:
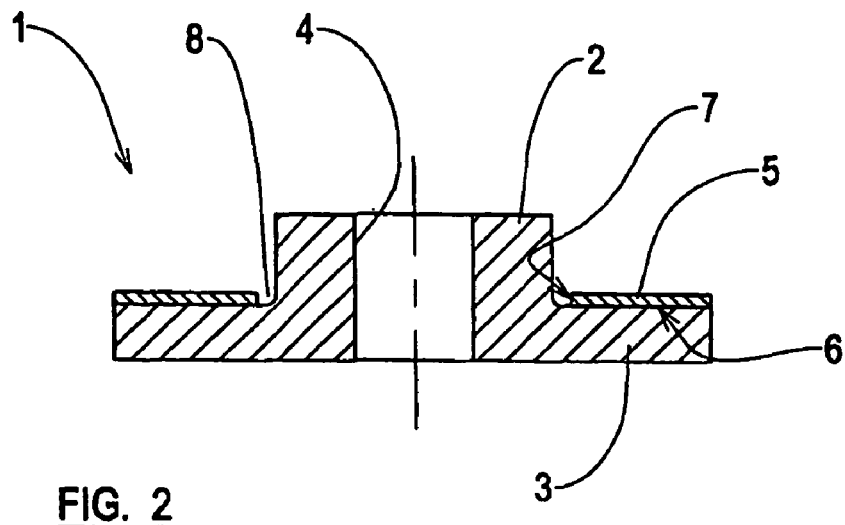
FIG. 2 is a cross-section through the bush of FIG. 1 taken along line A-A.
Figure 1:
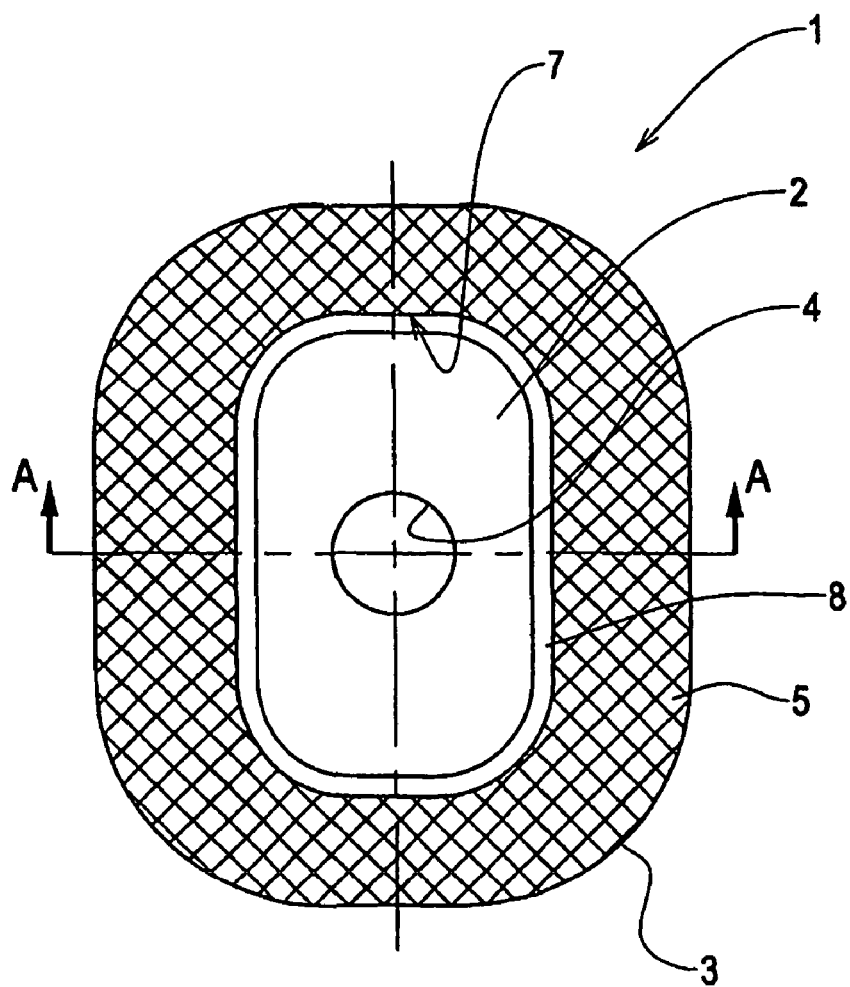
FIG. 1 is plan view of a flanged bush manufactured in accordance with a method embodying the present invention.

Referring to FIGS. 1 and 2, a flanged bush 1 embodying the present invention is configured, in this case, as a blow-down panel bush and comprises a spigot 2 surrounded by a flange 3. The spigot 2 and flange 3 are substantially rectangular in plan view, the corners of the rectangles being rounded as shown in FIG. 1. A central bore 4 runs through the spigot 2.

A ring of self-lubricating liner 5 such as a PTFE enriched woven metal or plastic mesh reinforced by resin sits on the flange surface 6 surrounding the spigot 2. The spigot 2 passes through an aperture 7 in the ring of liner material. There is a clearance gap 8 between the spigot 2 and the liner 5. The liner 5 is adhesively bonded to the flange surface 6.

A method embodying the present invention for manufacturing a bush as shown in FIGS. 1 and 2 comprises the following steps. Firstly, a bar of steel is cut to provide a billet 10 which will provide a blank from which the method embodying the present invention will provide, in this example, ten flanged bushes 1.

Referring to FIG. 3, one surface of the billet 10 is machined to leave ten upstanding spigots 2 in a regular array across the surface of the billet 10. A central bore 4 is machined through each of the spigots 2. Further, a pair of registration holes 11 are drilled through the billet 10. The registration holes 11 are provided on different radial axes so as not to be symmetrical with one another about any axis of the billet 10.

Referring now to FIG. 4, a sheet of self-lubricating liner 5 is provided into which are cut ten apertures 7 dimensioned to surround, with a clearance gap 8, each of the spigots 2. The apertures 7 in the liner are arranged in the liner sheet so as to register with the spigots 2 on the billet 10.

The liner 5 is also provided with two registration holes 12, which are intended to be aligned with the registration holes 11 on the billet 10 when the spigots 2 pass through their respective apertures 7 in the liner 5.

An adhesive is applied to the liner 5 and the billet surface or the liner 5 may comprise a self-adhesive surface on the surface of the liner 5 facing the surface of the billet 10.

Registration pins 13 are located in registration holes 11 and the liner 5 is laid over the billet 10 lining up the registration holes 12 with the registration pins 13 until the liner sits on the surface of the billet 10 with the spigots 2 protruding through the apertures 7 in the liner 5.

The liner 5 and the billet 10 are pressed together and a consistent and constant pressure is applied over the large surface area of the liner 5 pushing the liner 5 and billet 10 together to ensure a good adhesive bond between the liner 5 and the billet 10 over the complete surface area of the billet. It is much easier to provide a consistent pressure over the relatively large surface area of a billet 10 containing an array of many spigots 2 then over a ring of liner on a single flanged bush 1.

Referring now to FIG. 5, the billet 10 and liner 5 are placed in a stamping machine which is arranged to punch out simultaneously ten flanged bushes 1 from the billet 10. In FIG. 5, there is a dashed line 14 drawn around each of the spigots 2. This line comprises the punch line 14 or the line of cut which the stamping machine will create, effectively being the outline 14 of each of the flanged bushes 1.

The remaining surface of the billet 10 is punched away from the outlines 14 of the flanged bushes 1 leaving the flanged bushes 1 remaining. The stamping process cuts firstly through the liner 5 and then the material of what will comprise the flange 3 so that there is an element of compression of the liner 5 at the very edge of the flange surface and, indeed, the shearing action of the punching or stamping step creates a mechanical bond between the liner 5 and the flange 3 at the punch line 14, thus ensuring that the liner 5 is fully bonded around the edge of the flange to the flange.

Figure 6:
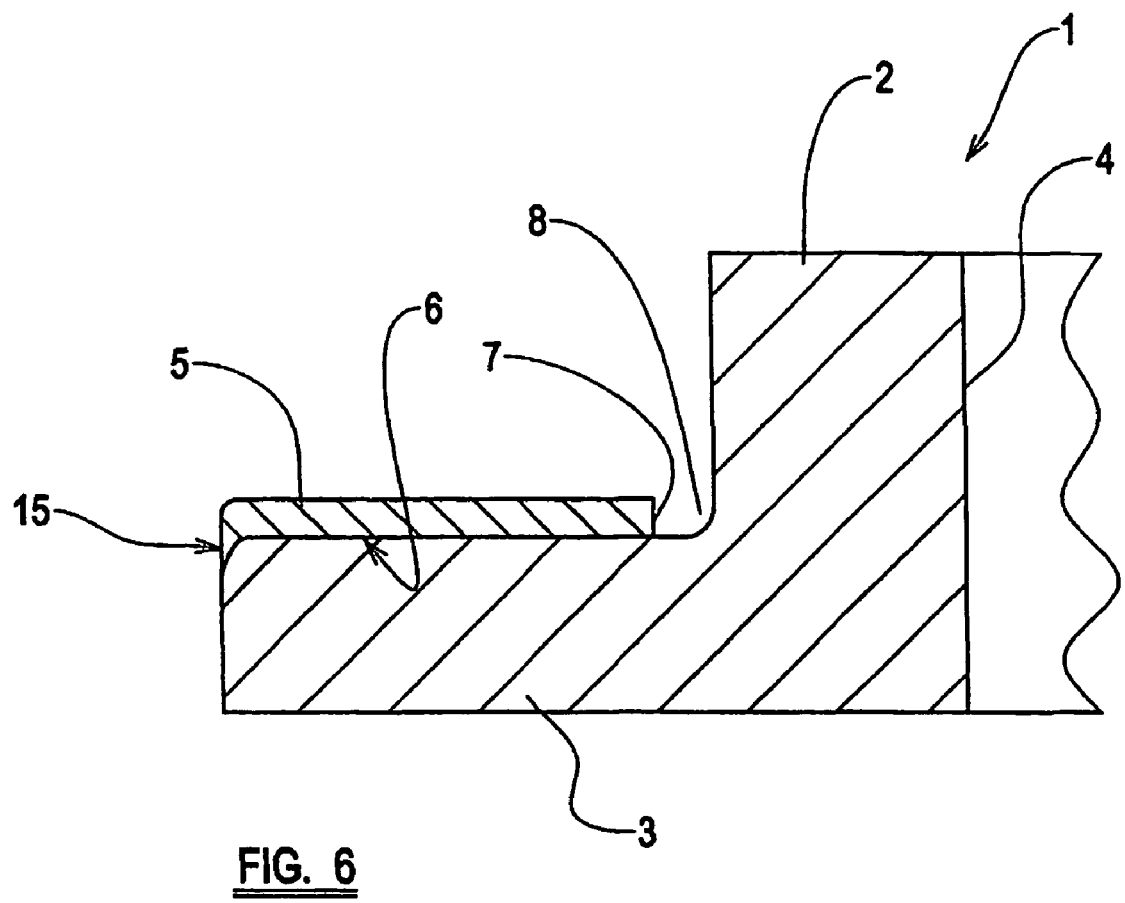
FIG. 6 is a detail of the bush of FIG. 2.

The stamping operation means that the previous manufacturing steps, used to produce a conventional panel bush, of trimming the liner 5 around the edge of the flange and removing the excess glue from between the liner and the edge of the flange are no longer required. The shearing action of the stamping or punching step means that the liner is very neatly finished with respect to the edge of the flange 3 and, as shown in FIG. 6, particularly when a metal mesh is used in the liner 5, there is an element of a mechanical bond 15 between the liner 4 and the flange 3 at the point of contact between the liner 5 and the flange 3 around the edge of the flange 3.

Another advantage of the use of the stamping technique where the liner has been pre-applied to the billet is the fact that the pressure can be applied to the liner more consistently over the large surface area of the billet 10 containing many bushes 1 as opposed to just on a single bush 1.

There is an additional advantage in that manufacturing the bushes from a reasonably sized, if not large, billet, is far preferable from a handling point of view to manufacture the bushes on an individual piece-by-piece basis.

In the present specification "comprises" means "includes or consists of" and "comprising" means "including or consisting of".

The invention claimed is:

1. A method of manufacturing a bush from a blank comprising:
providing a blank having a surface to be lined and at least one spigot upstanding from the surface; providing a liner having an aperture; locating the aperture in the liner around the spigot such that the liner lies on the surface; adhesively bonding the liner to the surface; and stamping out the blank around the spigot to provide a lined and flanged bush, the bush comprising a flange providing a flange surface formed from the surface of the blank, the flange surface surrounding the spigot, the bush comprising an adhesive bond between the flange surface and the liner and a mechanical bond between an outer edge of the liner and an edge of the flange as a result of the stamping step.

2. A method according to claim 1, wherein the act of stamping includes cutting through the liner and then into at least part of the blank.

3. A method according to claim 1, wherein the act of stamping comprises cutting completely through the blank.

4. A method according to claim 1, wherein the blank is stamped from the side of the blank provided with the liner.

5. A method according to claim 1, wherein pressure is applied to the liner prior to stamping to assist consistent bonding of the liner to the surface.

6. A method according to claim 1, wherein the liner around the spigot is spaced apart from the spigot by a clearance gap.

7. A method according to claim 1, wherein a plurality of spigots are provided on the blank and the liner is provided with at least a corresponding number of apertures, wherein the apertures are located around respective spigots such that the liner lies on the surface and the act of stamping out the blank around the spigot to provide a flanged bush is carried out simultaneously for all the spigots so as to provide a plurality of lined and flanged bushes from one stamping operation.

8. A method according to claim 7, wherein the spigots are provided on the blank in a regular array.

9. A method according to claim 1, wherein the blank is machined to provide the at least one spigot, the at least one spigot having a central bore machined therein.

10. A method according to claim 1, wherein the blank is a billet machined from a bar of material.

11. A flanged bush comprising: a spigot having a flange which provides a flange surface surrounding the spigot; and a liner having an aperture through which the spigot is located, wherein there is an adhesive bond between the flange surface and the liner and a mechanical bond between an outer edge of the liner and an edge of the flange; wherein the mechanical bond is provided by a stamping process which cuts firstly through the liner and then the material of what will comprise the flange to provide an element of compression of the liner at the very edge of the flange surface and create the mechanical bond between the liner and the flange.

12. A flanged bush according to claim 11, wherein the liner includes a metal mesh.

13. A flanged bush according to claim 12, wherein the liner is a self-lubricating liner.

14. A flanged bush according to claim 11, wherein the liner is a self-lubricating liner.

15. A flanged bush according to claim 12, wherein the mechanical bond is provided by a stamping process which cuts firstly through the liner and then the material of what will comprise the flange to provide an element of compression of the liner at the very edge of the flange surface and create the mechanical bond between the liner and the flange thus ensuring that the liner is fully bonded around the edge of the flange to the flange.

16. A flanged bush being formed by a method comprising:
providing a blank having a surface to be lined and at least one spigot upstanding from the surface;
providing a liner having an aperture;
locating the aperture in the liner around the spigot such that the liner lies on the surface;
adhesively bonding the liner to the surface; and
stamping out the blank around the spigot to provide a lined bush having a flange with a mechanical bond formed between a outer edge of the liner and an edge of the flange and an adhesive bond between the liner and a surface of the flange.

* * * * *